(12) United States Patent
Wada

(10) Patent No.: US 6,322,298 B1
(45) Date of Patent: Nov. 27, 2001

(54) TAPPING UNIT

(76) Inventor: Yoshinori Wada, 1-21-6, Akenodaira, Tomiya-cho, Kurokawa-gun, Miyagi-ken (JP)

( * ) Notice: Subject to any disclaimer, the term of this patent is extended or adjusted under 35 U.S.C. 154(b) by 0 days.

(21) Appl. No.: 09/422,054

(22) Filed: Oct. 21, 1999

(30) Foreign Application Priority Data

Oct. 22, 1998 (JP) .................................................. 10-338383
Sep. 28, 1999 (JP) .................................................. 11-273540

(51) Int. Cl.$^7$ .................................................. B23G 1/16
(52) U.S. Cl. .......................... 408/127; 408/137; 408/138
(58) Field of Search ........................... 408/56, 101, 102, 408/124, 127, 137, 138, 234; 470/96, 181

(56) References Cited

U.S. PATENT DOCUMENTS

| | | | | |
|---|---|---|---|---|
| 1,698,952 | * | 1/1929 | Hoover ................................. | 408/127 |
| 2,790,646 | * | 4/1957 | Emrick ................................. | 408/127 |
| 3,788,760 | * | 1/1974 | Daniels ................................ | 408/137 |
| 4,050,835 | * | 9/1977 | Womack .............................. | 408/137 |
| 4,645,388 | * | 2/1987 | Abrahamsen ........................ | 408/127 |
| 5,056,964 | * | 10/1991 | Naka et al. .......................... | 408/127 |
| 5,639,191 | * | 6/1997 | Womack .............................. | 408/137 |

OTHER PUBLICATIONS

Patent Abstracts of Japan, JP–7/009252, Jan. 13, 1995.
Patent Abstracts of Japan, JP–7/112324, May 02, 1995.
Patent Abstracts of Japan, JP–4/289021, Oct. 14, 1992.
Patent Abstracts of Japan, JP–7/060545, Mar. 07, 1995.

\* cited by examiner

Primary Examiner—Daniel W. Howell
(74) Attorney, Agent, or Firm—Browdy and Neimark

(57) ABSTRACT

Within the hermetically sealed interior of a housing 9, a driving bevel gear 15 is fixedly secured to an input shaft 12 coupled via a rotation transmission cable 5 to an output shaft of a drive unit. A spindle 19 rotates jointly and coaxially with the driving bevel gear 15, which meshes with a driven bevel gear 17 coupled in such a manner as to allow a relative displacement in the axial direction. The spindle 19 has an externally threaded portion 19A screwed in an internally threaded portion 20A of a master metal 20. The spindle 19 has one end protruding from the housing 9 to the exterior, the one end being provided with a spindle chuck 21 for retaining a tap T.

10 Claims, 13 Drawing Sheets

TAPPING UNIT

FIELD OF THE INVENTION

The present invention relates generally to a tapping unit adapted to be mounted on a machine body, a die, a hand, a jig, etc., of a press, an industrial robot, a transfer apparatus, etc., (hereinafter these are referred to generically as working machines), the tapping unit serving to tap a workpiece during the processes of the working machines.

DESCRIPTION OF THE RELATED ART

In the event that the workpiece is subjected to tapping by means of a tapper during the process of the press in continuous operations, the tapping time allocated to the one cycle of the press tends to become short, making it difficult to put the tapping timings in synchronism.

Furthermore, owing to the vertical movement and the horizontal movement effected between the feed position and the machining position when the workpiece is delivered to the next process, it is difficult to three-dimensionally precisely position the tap relative to the workpiece and to complete the forward and reverse rotations at accurate feed pitches.

In addition, a mechanism for tapping has to be incorporated in a limited space within the press die.

To address such problems, a variety of techniques have hitherto been proposed, as in for example Japan Patent No. 2,562,298. This has a structure as shown in FIG. 13 in which a screw/nut system coupled to a movable part A2 of a press A1 toward a ram is used to convert the vertical movements of the movable part A2 into forward and reverse rotational movements and in which the tap is driven by way of a transmission mechanism of a tapper A4 mounted on a die associated with a bed, to thereby tap a workpiece W resting on the press A1.

As can be seen from Japan Patent Laid-open Pub. Nos. Hei 7-112324, Hei 4-289021 and Hei 7-060545, tappers have also been proposed in which a motor is provided and is fitted to the die or the press head without utilizing the movements of the press movable part as the driving forces.

Furthermore, as seen in FIG. 14, a technique is known in the past.in which the direction of rotations of an output shaft B3 is changed by use of a rotation transmission cable B2 extending from a tapping machine or a drilling machine having a multi spindle head B1, to rotate a spindle B7 screwed with a master metal B6 fitted to a press B5.

The technique shown in the diagram enables the hexagonal shaft or the sleeve with splines for rotating a spindle B7 to be eliminated since the flexibility of the rotation transmission cable B2 can accommodate the screwing stroke L of the spindle B7 carrying a tap T, and is widely used typically as means for simultaneous tapping of the workpiece W from multiple directions after the completion of the pressing process.

Providing that the tapper is mounted on the die with high accuracy attachment machining and adjustment, the technique disclosed in the Japan Patent No. 2,562,298 enables the tapping work to be performed in a substantially perfect synchronism. with the pressing actions unless any mechanical failures occur, thereby achieving a high-speed operation.

However, due to the structure in which the reciprocating motions are converted into forward and reverse motions by way of the screw/nut system using the movement of the movable part as its reference, the pitch feed mechanism fitted with the tap and the spindle are fixedly secured to the die, or otherwise secured thereto while permitting only a slight vertical displacement, making it difficult to displace it in the horizontal direction, in particular, in to-and-fro directions.

The attachment positions have to be adjusted at two or more sites, and every time the die height adjustment is performed, that is, the ram height is adjusted depending on the type of the die used, the attachment positions need to be adjusted.

Furthermore, due to the fixed horizontal distance d in the to-and-fro directions (see FIG. 13) between the ram associated attachment part and the bed-associated attachment part, it is difficult to replace a die with another die having a different specification for each step, resulting in less versatility.

On the other hand, in case of those disclosed in Japan Patent Laid-open Pub. Nos. Hei 7-112324, Hei 4-289021 and Hei 7-060545, limitation is imposed on the reduction in size since the major part of the apparatus including the drive source (motor) is secured to the die or the press head.

Also, in spite of achievement of size reduction, a precise tap pitch feed mechanism may be omitted as described in Japan Patent Laid-open Pub. No. Hei 7-11232, or inversely, the measures for the correct pitch feed may impede the size reduction, resulting in a tapper dedicated to that die or the associated machine.

With respect to that shown in FIG. 14, it will ready be conceivable and has been attempted in fact to fit the master screw of the spindle coupled to the tip of the rotation transmission cable to the interior of the die to thereby extremely simply integrate it with the press.

However, due to the use of the rotation transmission cable as the means for changing the rotational direction of the output shaft for the transmission, it is possible to arrange the master metal and the spindle in close vicinity of the workpiece from every directions, whereas in terms of the structure of the cable, the permissible bend radius r is as large as approximately 150 mm in case of the 6-mm inner shaft lying within the rotation transmission cable, and a straight part must be provided at the rotation cable end, which may result in a deficiency that the length extending axially from the spindle may be increased.

Furthermore, the spindle has its axial feed stroke, so that it cannot be accommodated in the height H1 of the lower platen, and even though successfully it has been attached within the permissible bend radium of the rotation transmission cable, the increased length results in an increase in the weight to be at all times born by the master metal.

In addition, there may occur a bend angle at the connection between the spindle formed with a master screw and the rotation transmission cable, the bending load resulting in a shock load which in turn combines with the load arising from the weight of the rotation transmission cable. The resultant combined load acts on the portion between the master screw and the master metal, whereupon the contact surface pressure between the two increases resulting often in a poor lubrication such as short of lubricant films. Additionally, because the master screw and the master metal do not have protection means against dusts, they may become abraded at an earlier stage.

Thus, the multiple head fitted with a multiplicity of elongated and weighted rotation transmission cables comes to have an increased rotational resistance due to the moments of inertia and frictions of their respective output shafts, which results in an increased power loss, whereupon it will be difficult for the power performance of the tapping machine designed to be originally operated solely to achieve a synchronism with the continuous operation of the press.

Furthermore, typical tapping machines use a three-phase induction motor as its drive source together with optional electromagnetic brake. When the motor is activated twice, i.e., forward, halt, reverse, halt for each stroke of the spindle carrying the tap, with the iteration of the advance/retreat stroke of the spindle, the motor may be subjected to a large current every time the rotational direction is changed over, resulting in possible burning of the oil or in possible failure of the relay circuit. The repetition of the advance/retreat stroke may further result in early abrasion of the brake.

On the contrary, proposed as measures to obviate the above deficiencies is one mechanically effecting the switching of the spindle forward and reverse rotations by use of a combination of a crank and a drive screw, or a rack and a pinion gear, with the motor rotating at all times in one direction (e.g., Japan Patent No. 2,130,082).

It would nevertheless be impossible for such measures to overcome the limited number of times of activation of the motor or restricted ability of the relay contact.

Furthermore, the three-phase induction motor cannot provide a torque enough for the tapping work during the initial accelerated rotations immediately after the activation, whereupon the tapping work cannot be at once performed starting from the position where the tap is in contact with the prepared hole formed in the workpiece, resulting in an increased machining time lag as well as in lowered halt accuracy, which may impair the reliability in the accuracy of the tapped threads.

SUMMARY OF THE INVENTION

It is therefore the object of the present invention to provide a tapping unit capable of solving the above problems involved in the prior art and capable of being mounted on a working machine such as a press separately from a drive unit, to tap, at a high speed and a high accuracy, a workpiece in the process of the working machine.

In order to attain the above object, according to an aspect of the present invention there is provided a tapping unit comprising a housing with the hermetically sealed interior, removably secured to a movable member of a working machine such as a press, the movable member being displaced together with a workpiece, an input shaft rotatably supported via a bearing within the interior of the housing, the input shaft having one end protruding outwardly from the housing, the one end being coupled to an output shaft of a drive unit by way of a rotation transmission cable; a driving bevel gear fixedly secured to the other end of the input shaft within the housing; a driven bevel gear meshed with the driving bevel gear and rotatably supported via a bearing at a fixed location within the housing; a spindle rotating jointly and coaxially with the driven bevel gear, the spindle being coupled to the driven bevel gear in such a manner as to allow a relative displacement in the axial direction, the spindle having one end protruding outwardly from the housing, the one end being provided with a spindle chuck for holding a tap, the spindle having a portion lying at all times within the interior of the housing, the portion having an externally threaded portion formed on its outer periphery; and a master metal fixedly secured to the interior of the housing, the master metal having an internally threaded portion mating with the externally threaded portion of the spindle.

In the tapping unit of the present invention, it is preferred that the internally threaded portion of the master metal be formed with at least one oil storage groove extending in the direction intersecting with threaded grooves.

Preferably the tapping unit of the present invention uses a pulse motor providing pulse control of shaft angle indexing to the drive source included in the drive unit, whereby in use of the pulse motor, a high-speed rotation, a high-torque activation and a rapid halt are set in advance so as to ensure that the forward and reverse actions of the tap are effected in a brief period of time during which the movable member of the working machine carries the workpiece. At that time, the drive timings of the forward and reverse actions of the tap in the tapping process are controlled on the basis of timing signals from the working machine.

Preferably, control is provided of the rotational angles and the axial locations of the tap corresponding to the actions of the working machine by subjecting the pulse motor shaft angles to real-time, absolute-value control on the basis of drive signals fed from the counterpart work machine into the pulse motor.

In use the tapping unit of the present invention is removably mounted on a movable member which moves together with a workpiece, such as a machine body, a die or a hand of working machines including a press, an industrial robot and a transfer apparatus.

It may also be incorporated into a work bench for use as a simple tapping jig.

The tapping unit of the present invention has a housing whose interior is hermetically sealed, thereby providing a structure for preventing external dust or the like from entering the interior of the housing as well as a structure for preventing internal lubricating oils or the like from leaking out to dirty the peripheries.

More specifically, gaps present in the housing are hermetically sealed by use of sealing members such as O-rings to thereby completely seal the interior of the housing from the exterior.

It is also preferred that the housing have a light weight since it is fixedly secured to the movable member of the working machine in use and hence that it be made of aluminum or aluminum-based light alloys.

The tapping unit has the input shaft which is rotationally driven by the drive unit through the rotational transmission cable, and rotations of the input shaft are transmitted to the driving bevel gear provided within the housing, and further, via the driven bevel gear meshing with the driving bevel gear, to the spindle provided with a spindle chuck carrying the tap outside the housing.

The spindle advances and retreats in the axial direction with the rotations through the meshing of the internally threaded portion of the master metal fixed within the housing with an externally threaded portion of the spindle. Forward rotations of the spindle cause an advance of the same, allowing the tap to bite into a prepared hole previously formed in the workpiece carried by the spindle chuck, to thus form a threaded hole. Reverse rotations of the spindle cause a retreat of the same so that the tap can exit the threaded hole formed in the workpiece.

At that time, the driven bevel gear is rotatably supported via bearing within the housing, and the spindle is coupled to the driven bevel gear in such a manner as to allow coaxial integral rotations and axial relative displacements, so that the axial displacement of the spindle is not transmitted to the input shaft and hence no thrust load is applied to the rotational transmission cable. It is to be appreciated that the coupling means between the spindle and the driven bevel gear can easily be implemented by use of the splines or keys.

In the tapping unit of the present invention, the transmission of rotations between the input shaft and the spindle is effected by means of the driving bevel gear and the driven bevel gear, whereupon the tap can be orientated at right angles or substantially right angle to the input shaft, allowing the tapping to be performed on the workpiece from various directions.

Providing that the internally threaded portion of the master metal is formed with the oil storage groove extending in the direction intersecting the threaded grooves, the lubricant is stored in the oil storage groove so that the rotation of the spindle causes the lubricant to be supplied to the gap between the internally threaded portion and the externally threaded portion of the spindle.

To obtain a certain effect, the oil storage groove may not necessarily be provided over the entire length of the internally threaded portion, although in case the lubricant is sealed in the housing of the tapping unit, the provision over the entire length would be more effective since the oil surface can rise or lower for each stroke of the spindle.

Also, when an inlet and an outlet for the lubricant are provided on both sides of the master metal, the groove may not extend through the entire axial length in case of drip-feed type, but it may extend throughout in case of compulsory circulation by use of an oil pump, thereby achieving an enhanced lubricating effect as well as enhanced cooling effect.

The at least one oil storage groove may be provided having a circular section or a triangular or other polygonal section and in parallel with the central axis of the master metal or in a spirally slightly bent manner.

In case of using the pulse motor as the drive source included in the drive unit for driving the tapping unit, the spindle carrying the tap can be halted at the previously set retreat position and advance position with a high accuracy without using the electromagnetic brake or the like, and it can endure frequent forward and reverse drives as well as abrupt halting action, which may be iterated at short time intervals.

In case of using the pulse motor as the drive source, the load torque applied to the pulse motor and the time required for the tapping work have merely to be figured out so that all the actions of the spindle forward and reverse rotations and halt under the load upon the tapping work can be effected within the range of the rated load, thereby providing endurability for the long-term continuous use.

Furthermore, in case of using the pulse motor as the drive source included in the drive unit, on the basis of the output signals from the timing output switch such as the rotary cam switch or from the pulse encoder, control can be provided of the timings of the pulse motor rotations and halts as well as the positions of the movable member of the working machine in order to ensure that the forward and reverse actions of the tap during the tapping process are effected in a brief period of time during which the movable member carries the workpiece.

In this instance, the pulse motor can be controlled by means of one of three methods which follow. The first method is a sequential method in which initially, in response to signals associated with halt or other operational conditions established on the working machine side, the pulse motor performs one cycle actions of the forward, reverse and halt, and then a completion signal is returned to the working machine side to meet the operational conditions of the working machine.

The second method is a method in which during the continuous operations of the working machine there are accepted signals indicative of tapping permitted time within which the pulse motor promptly performs the one cycle actions of the forward, reverse and halt to complete the tapping work.

This method however necessitates a judgment of whether the tapping work has been completed or not within the permitted period of time, to send an interlock signal to the working machine side.

The third method is a method in which the pulse encoder detects the positions of the movable part of the working machine and the relationship between the resultant pulse signals and the pulse motor rotational angles are programmed in advance, whereby control is provided on the basis of pulse absolute values by allowing the pulse motor rotational angles to correspond to the pulse signals accepted in real time. Hereinafter, as used in this specification, this is referred to as absolute-value control.

The control means for the control of the pulse motor can be one of the three control methods if it is selectively and feasibly provided, or otherwise only a single control method could be arranged for execution.

Also, without being interlinked with the working machine, the workpiece holding jig fitted with the tapping unit may be mounted on the upper part of the drive unit so that the pulse motor can be driven in response to detection signals from the workpiece detection sensor or to manual entry, whereby the tapping unit may be used as a tapper having wide applications capable of sole operations.

BRIEF DESCRIPTION OF THE DRAWING FIGURES

The above and other objects, aspects, features and advantages of the present invention will become more apparent from the following detailed description when read with reference to the accompanying drawings.

DESCRIPTION OF THE PREFERRED EMBODIMENT

Figure 1:
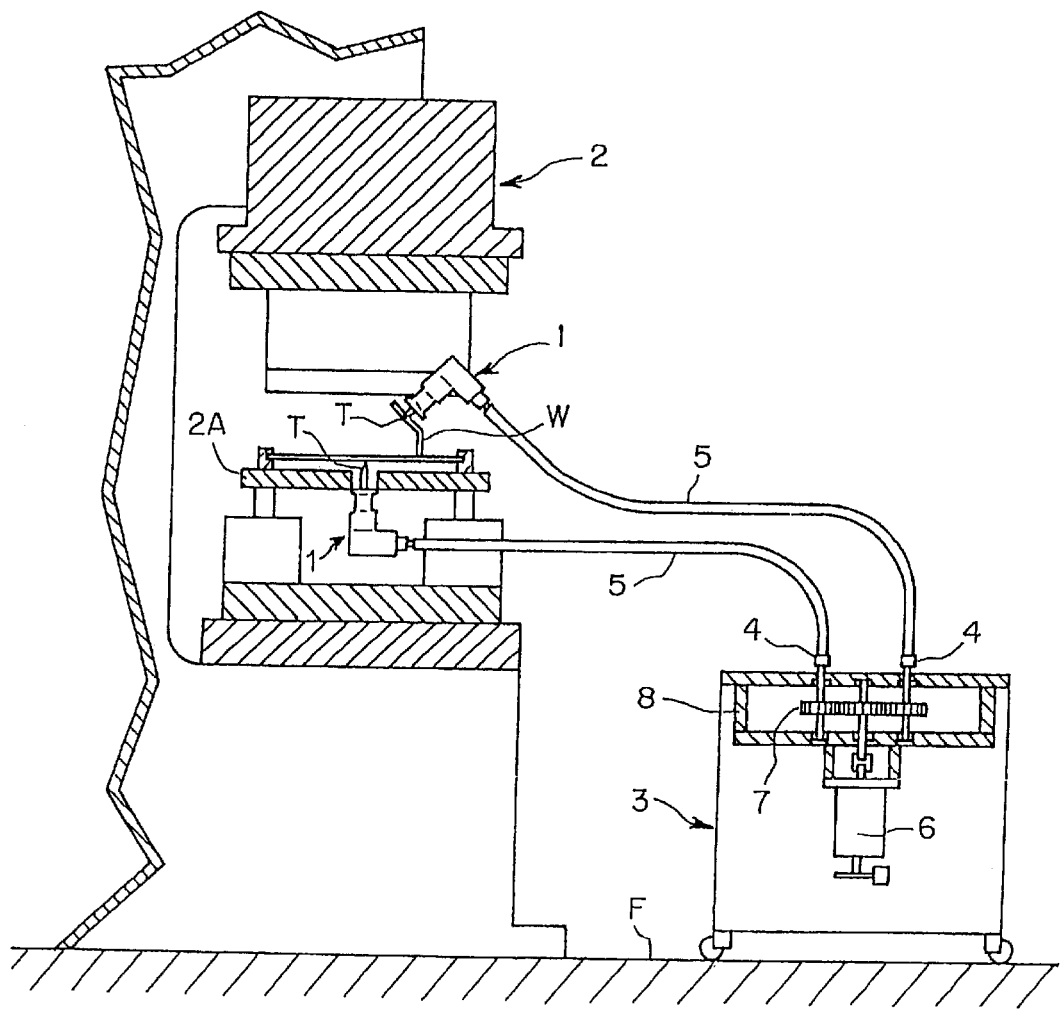
FIG. 1 is a schematic view of an embodiment of a tapping unit in accordance with the present invention used with a press.

FIG. 1 illustrates a tapping unit in accordance with an embodiment of the present invention. The tapping unit 1 is removably attached to a lower platen 2A of a press 2 in order to form a threaded hole in a workpiece W fixedly mounted on the lower platen 2A.

In this embodiment, two tapping units 1 are attached to the lower platen 2A at different locations so as to provide a function as a multiple tapping unit. In use, one of these tapping units 1 is secured to the undersurface of the lower platen 2A and the other is fixedly positioned diagonally above the lower platen 2A.

The tapping units 1 are each fitted with a tap T for tapping the workpiece W. When a plurality of output shafts 4 of a drive unit 3 with casters movably placed on a floor F in the vicinity of the press 2 are rotationally driven, the tap T of the tapping unit 1 is driven by way of rotation transmission cables 5 coupled to the output shafts 4.

The drive unit 3 includes therein a pulse motor 6 serving as a drive source, a gearbox 8 accommodating a gear train 7 for the transmission of rotation of the pulse motor 6 to the plurality of output shafts 4, and a control system not shown for providing a drive control to the pulse motor 6.

In the gearbox 8 used herein, a single gear intervenes between the pulse motor 6 and each output shaft 4 so that it can additionally transmit to the associated output shaft a deficiency which may occur despite use of maximum speed of rotations of the pulse motor, with a minimal increment of rotational speed, thereby minimizing an increase of moment of inertia in the region of the gear train 7.

The rotation transmission cable 5 has a structure allowing a removable coupling to any output shaft 4.

Figure 2:
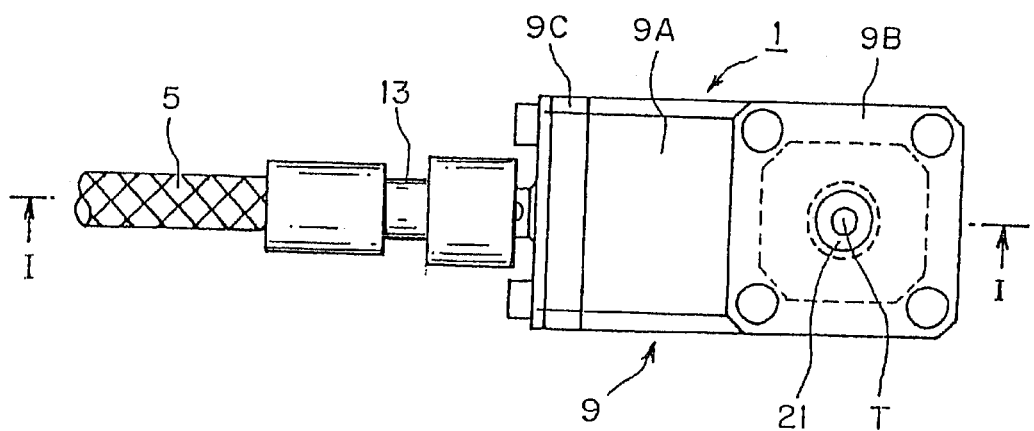
FIG. 2 is a top plan view of the tapping unit of the present invention.
Figure 3:
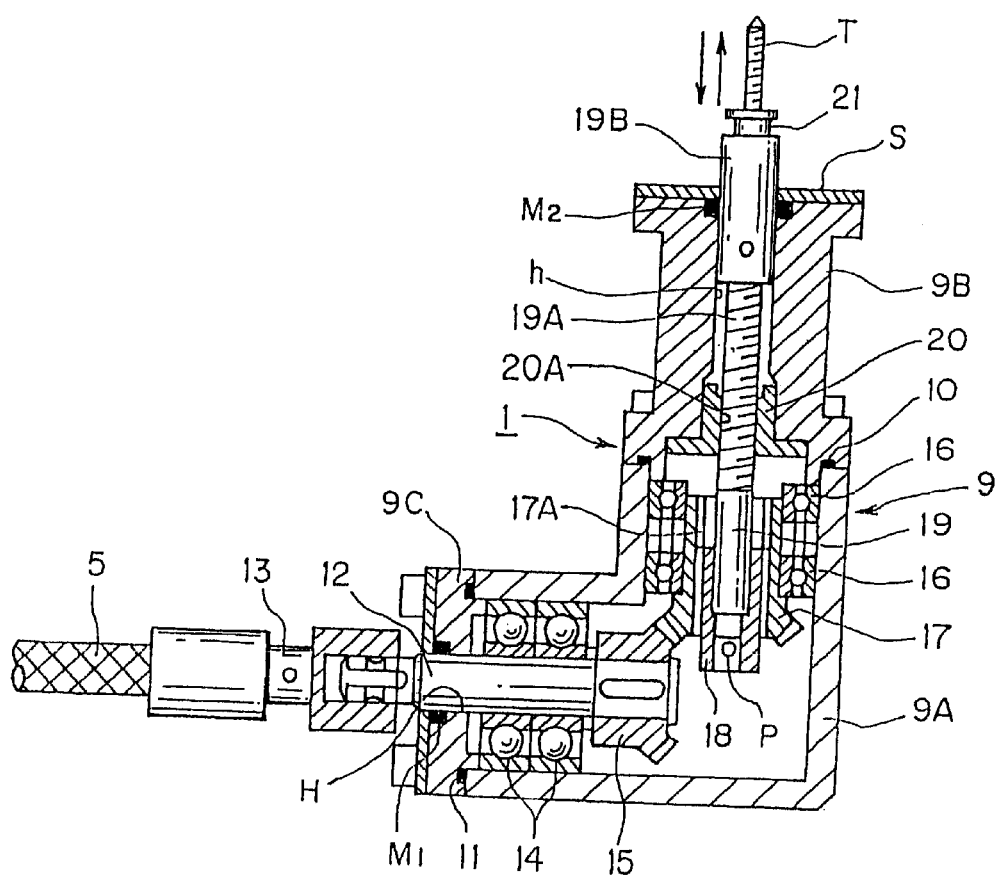
FIG. 3 is a sectional view of the tapping unit of the present invention taken along a line A—A of FIG. 2.

FIG. 2 is a top plan view of the tapping unit 1, and FIG. 3 is a sectional view of the same taken along line A—A of FIG. 2, in which the tapping unit 1 has a generally L-shaped housing 9.

The housing 9 comprises a box-like housing body 9A having a hollow interior, an attachment flange 9B secured to one end of the housing body 9A, and an end cover 9C fitted into an opening at the other end of the housing body 9A to block the opening, with the confronting surfaces at their respective junctions being sealed by sealing members 10 and 11.

This embodiment employs O-rings as the sealing members 10 and 11.

In order to reduce their weights, aluminum is used as the materials of housing body 9A, the attachment flange 9B and the end cover 9C.

The end cover 9C has a centrally located shaft hole H through which there extends the input shaft 12 in a freely rotatable manner. One end portion of the input shaft 12 projecting outwardly from the end cover 9C is releasably coupled via a universal joint 13 to a flexible shaft rotatably provided within the interior of the rotation transmission cable 5.

A rotary seal M1 is disposed as a sealing member to provide a seal between the shaft hole H and the input shaft 12.

The input shaft 12 is rotatably supported at a fixed location by a pair of bearings 14 juxtaposed within the housing body 9A. The other end of the input shaft 12 accommodated within the housing body 9A has a driving bevel gear 15 securely fixed thereto.

With crossed axes angle of approximately 90 degrees, the driving bevel gear 15 meshes with a driven bevel gear 17 rotatably supported at a fixed location by a pair of bearings 16 within the housing body 9A.

The driven bevel gear 17 has an axially elongated boss 17A whose outer peripheral surface is fitted in and supported by the inner peripheral surfaces of the pair of the bearings 16.

The boss 17A has a central hole formed with spline grooves, into which is inserted a spline sleeve 18 slidably fitted in the spline grooves.

A spindle 19 has one end jointly fixed to the spline sleeve 18 by means of a fixing pin P.

The intermediate portion of the spindle 19 is formed with an externally threaded portion 19A. The externally threaded portion 19A is screwed into an internally threaded portion 20A extending centrally through a master metal 20 which is provided within the housing 9 and which will be described hereinbelow.

The master metal 20 is partly fixedly inserted into a spindle insertion hole h extending centrally axially through the attachment flange 9B.

Figure 4A:
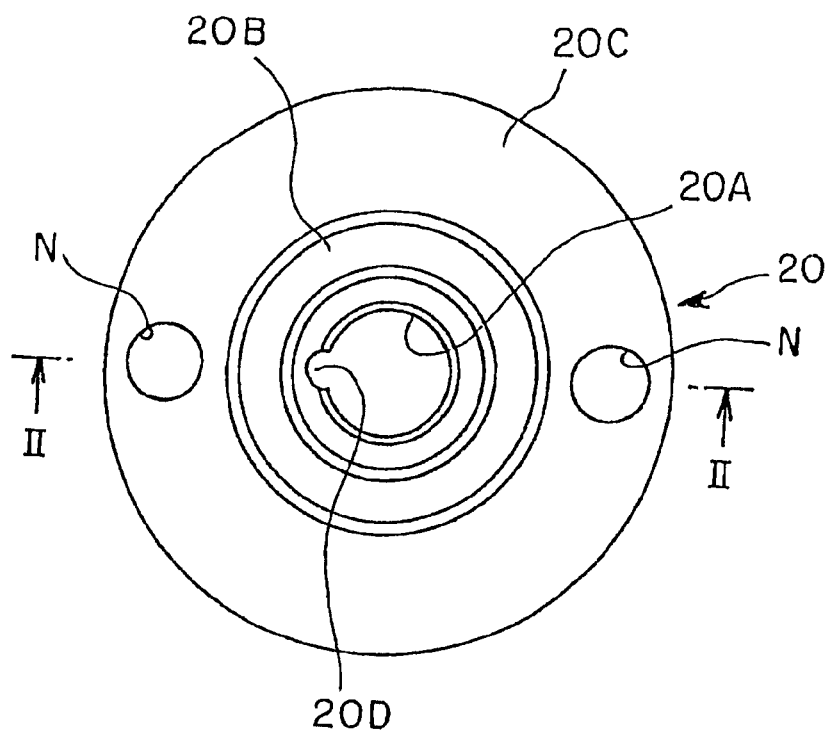
FIG. 4A is a top plan view of a master metal for use in the tapping unit.
Figure 4B:
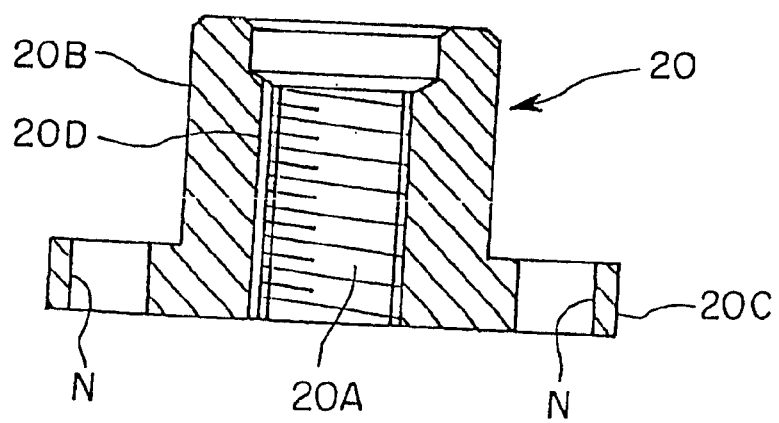
FIG. 4B is a sectional view of the master metal taken along a line B—B of FIG. 4A.

As shown in FIGS. 4A and 4B, the master metal 20 comprises a tubular portion 20B positioned within the spindle insertion hole h, and a collar 20C formed integrally with the outer periphery of the tubular portion 20B. The collar 20C is formed with through holes N for screwing the master metal 20 on the end face of the attachment flange 9B toward the housing body 9A.

The internally threaded portion 20A is provided with an oil storage groove 20D of a substantially semicircular section extending over its entire axial length so as to intersect the threads of the internally threaded portion 20A.

Figure 5:
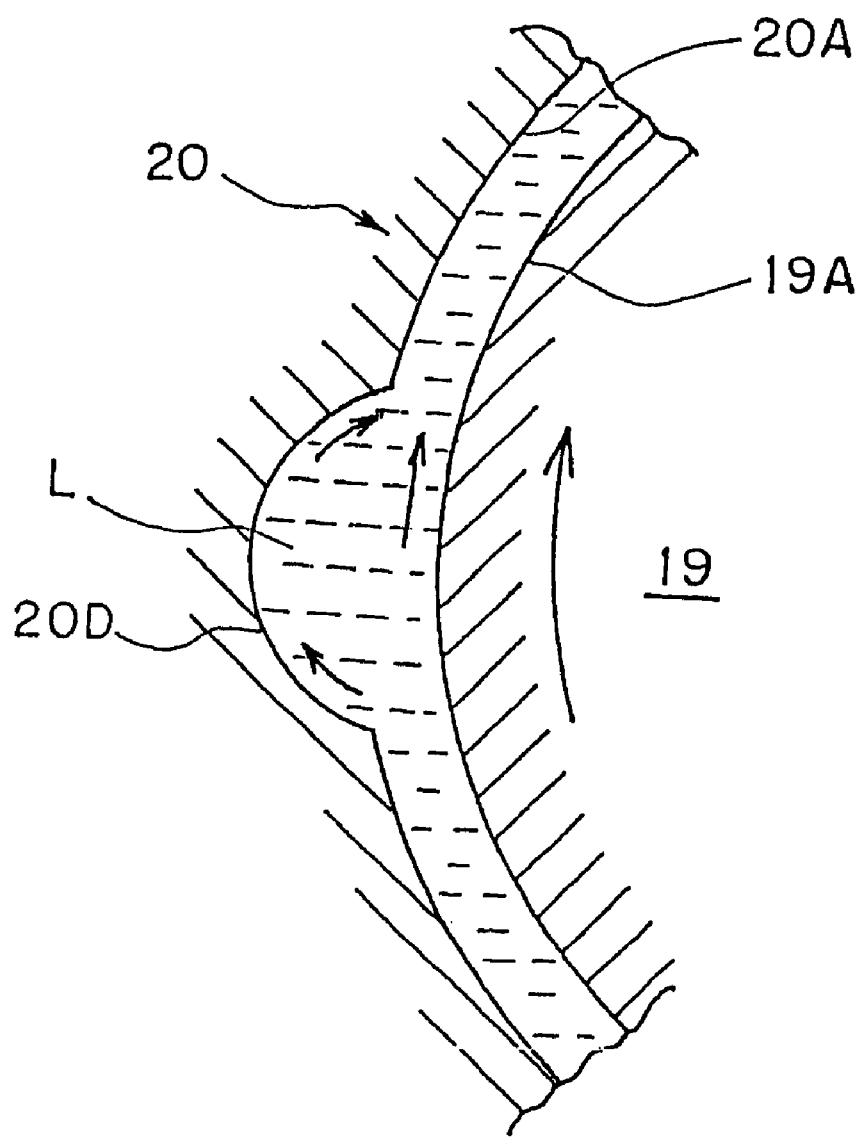
FIG. 5 is a diagrammatic view showing the state of lubrication between the master metal and a spindle.

The oil storage groove 20D, as shown in FIG. 5, serves to store lubricant L to be fed to a gap defined between the externally threaded portion 19A of the spindle 19 and the internally threaded portion 20A of the master metal 20. Due to the rotation of the externally threaded portion 19A relative to the internally threaded portion 20A, the lubricant L within the oil storage groove 20D is entrained by the externally threaded portion 19A and is delivered to the gap between the externally threaded portion 19A and the internally threaded portion 20A, thereby making it possible to keep a satisfactory lubricating state.

Referring back to FIG. 3, the spindle 19 protrudes partially from an attachment surface S of the attachment flange 9B, and the protrusion has a spindle chuck 21 disposed in the region of its tip for removably grasping the tap T.

Between the spindle chuck 21 and the externally threaded portion 19A of the spindle 19 is formed a chuck holding portion 19B having a cylindrical peripheral surface with a diameter adapted to the spindle insertion hole h of the attachment flange 9B.

A rotary seal M2 is interposed as a sealing member for hermetically sealing a gap between the outer peripheral surface of the chuck holding portion 19B and the surface of the spindle insertion hole h in the vicinity of the attachment surface S.

Figure 6:
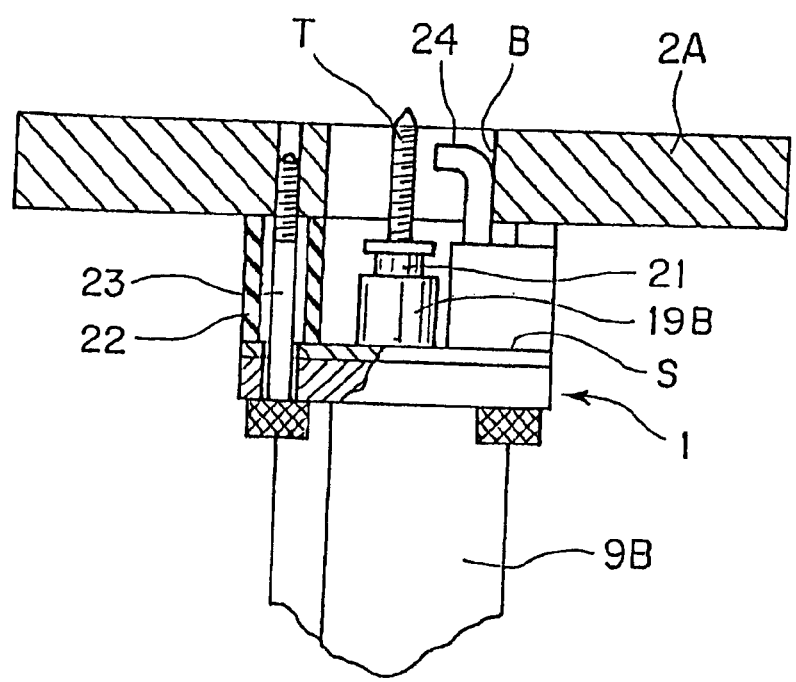
FIG. 6 is a fragmentary view showing a structure of mounting of the tapping unit onto a press lower platen.

FIG. 6 illustrates the state of attachment of the tapping unit 1 being mounted on the underside of the lower platen 2A of the press 2, with the lower platen 2A being formed with an opening B for allowing the tap T to vertically advance and retreat therethrough.

The tapping unit 1 is supported in suspension such that it may possibly slightly float relative to the lower platen 2A by means of a mounting bolt 23 extending through an urethane rubber collar 22, with a view to adjustment of height and, if necessary, to fine adjustment of positioning.

This arrangement allows the flowing displacement of the tapping unit 1 relative to the lower platen 2A to accommodate the offset of the longitudinal axis of the tap relative to the center of a prepared hole previously formed in the workpiece W shown in FIG. 1, which offset may often occur when the tap advances and bites into the prepared hole upon the tapping of the workpiece W.

It is to be noted that in the event of no fear of occurrence of the offset of the tap longitudinal axis relative to the prepared hole center, the collar 22 may be made of a metal.

Within the opening B formed in the lower platen 2A is positioned a tapping oil nozzle 24 for feeding tapping oil to the tap T.

The tapping oil nozzle 24 may be mounted on either the tapping unit 1 or the lower platen 2A, with an oil supply pump not shown being provided to supply the tapping oil to the tapping oil nozzle 24. It is to be appreciated that the tapping oil nozzle 24 may not necessarily be provided depending on circumstances.

Although FIG. 1 does not illustrate any detailed attachment structure of the tapping unit 1 positioned above the lower platen 2A, it can be mounted on the lower platen 2A in a floatable manner in the same manner as that shown in FIG. 6, with the tapping oil nozzle being disposed likewise in the vicinity of the tap T.

Figure 7:
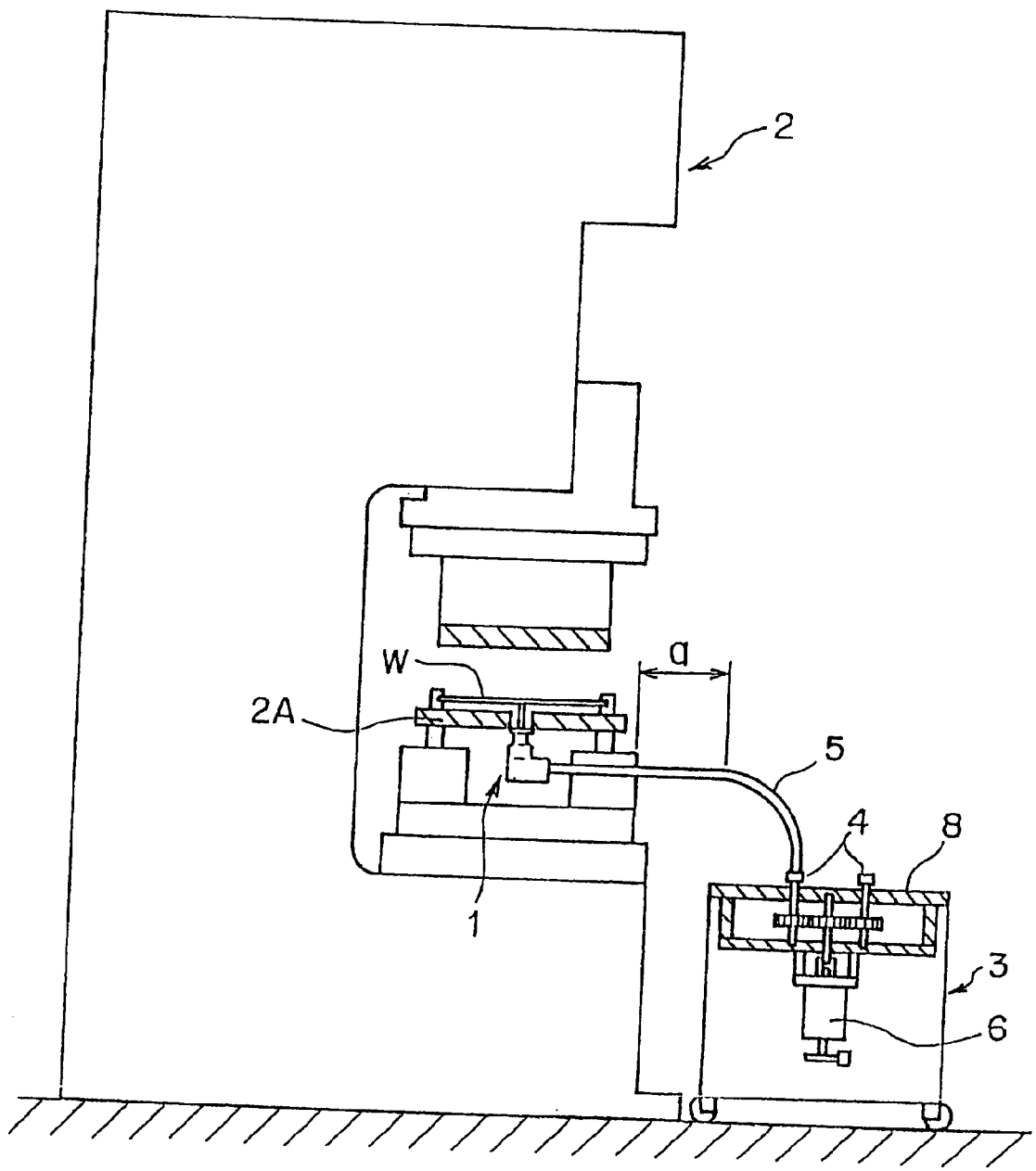
FIG. 7 illustrates by way of example a form of coupling between a drive unit and the tapping unit by use of a rotation transmission cable.

Description will then be made of the form of coupling between the tapping unit 1 and the drive unit 3. Referring to FIG. 7, the rotation transmission cable 5 extends from the upward projecting output shaft 4 of the drive unit 3 by way of a bend with a large radius of curvature and, from the substantially horizontal direction, connects with the tapping unit 1. In such a case, a surplus length a for allowing a deformation is preferably provided between the bend of the rotation transmission cable 5 and the entrance to the press 2, thereby preventing a larger bending load from acting on the bend upon the vertical movements of the lower platen 2A.

Figure 8:
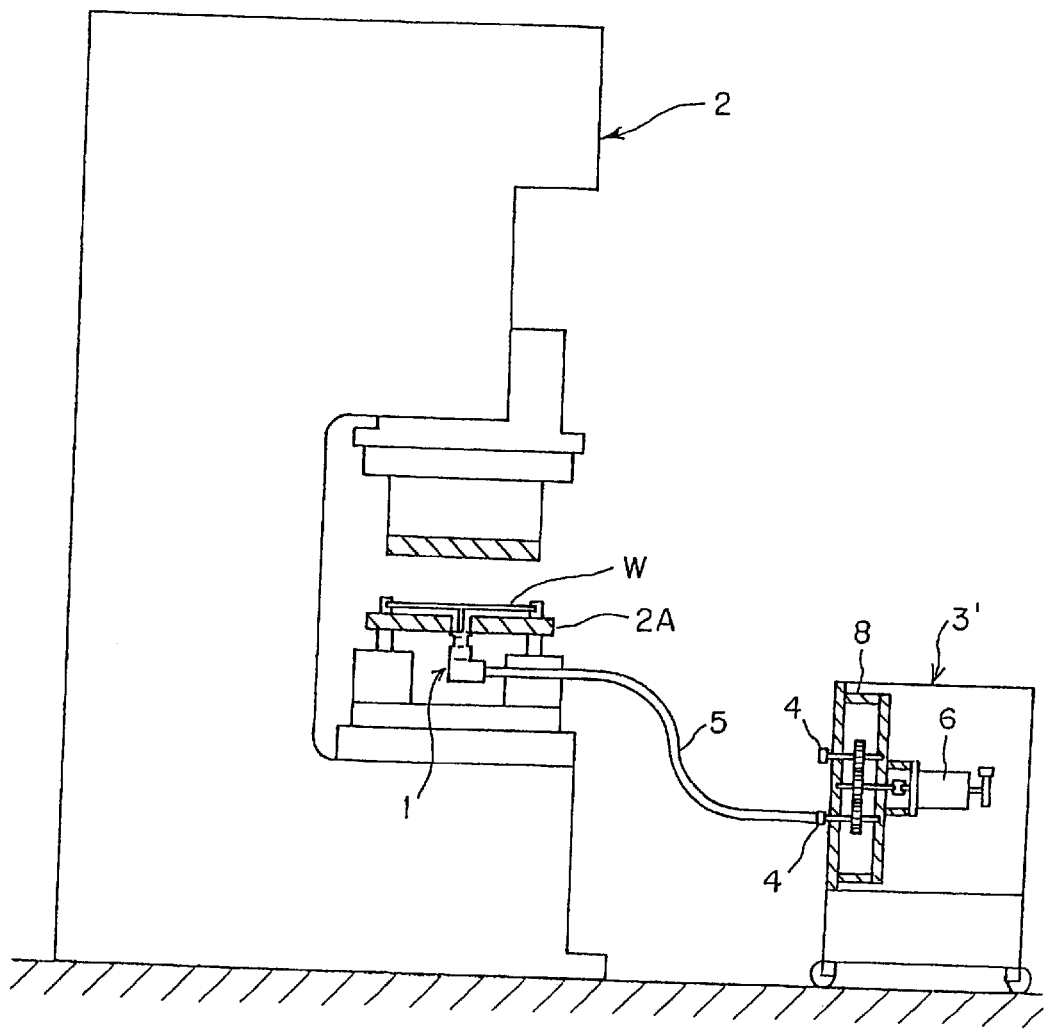
FIG. 8 illustrates by way of example another form of coupling between a drive unit and the tapping unit by use of the rotation transmission cable.

Referring then to FIG. 8, a drive unit 3' has a horizontally projecting output shaft 4, and the gearbox 8 and the pulse motor 6 having the structures shown in FIGS. 1 and 7 are laid sideways.

In this case as well, the rotation transmission cable 5 has to have a sufficient surplus length to reduce the bending stress which may be caused by the vertical motions of the lower platen 2A. It is nevertheless preferred to employ the form of coupling as shown in FIG. 7 in order to ensure a smooth transmission of rotational forces without subjecting the rotational transmission cable 5 to any undesired bending stress.

Figure 9:
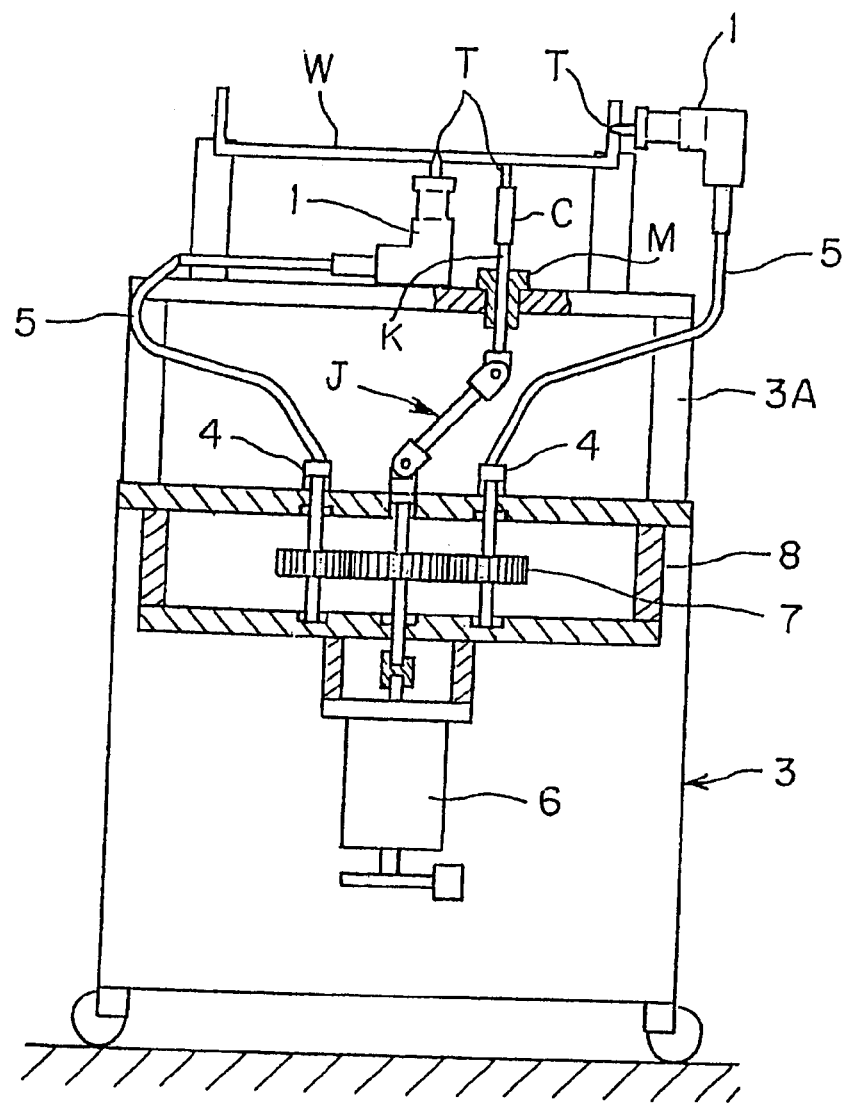
FIG. 9 shows a multiple tapper including a plurality of tapping units mounted on the drive unit.

Referring then to FIG. 9, the drive unit 3 shown in FIGS. 1 and 7 is mounted removably with a workpiece holding jig 3A carrying a workpiece W thereon. The workpiece holding jig 3A is fitted with a plurality of tapping units 1 having taps T pointed to various different directions. Thus, a multiple tapping unit having a higher degree of freedom of machining in use is provided.

In the diagram, similar to the conventional multiple tapping machines, one of the plurality of output shafts 4 of the drive unit 3 connects with a spindle K threaded into the master metal M by way of a universal joint J so as to allow rotations of the tap P carried by the spindle chuck C at the tip of the spindle K.

Figure 10:
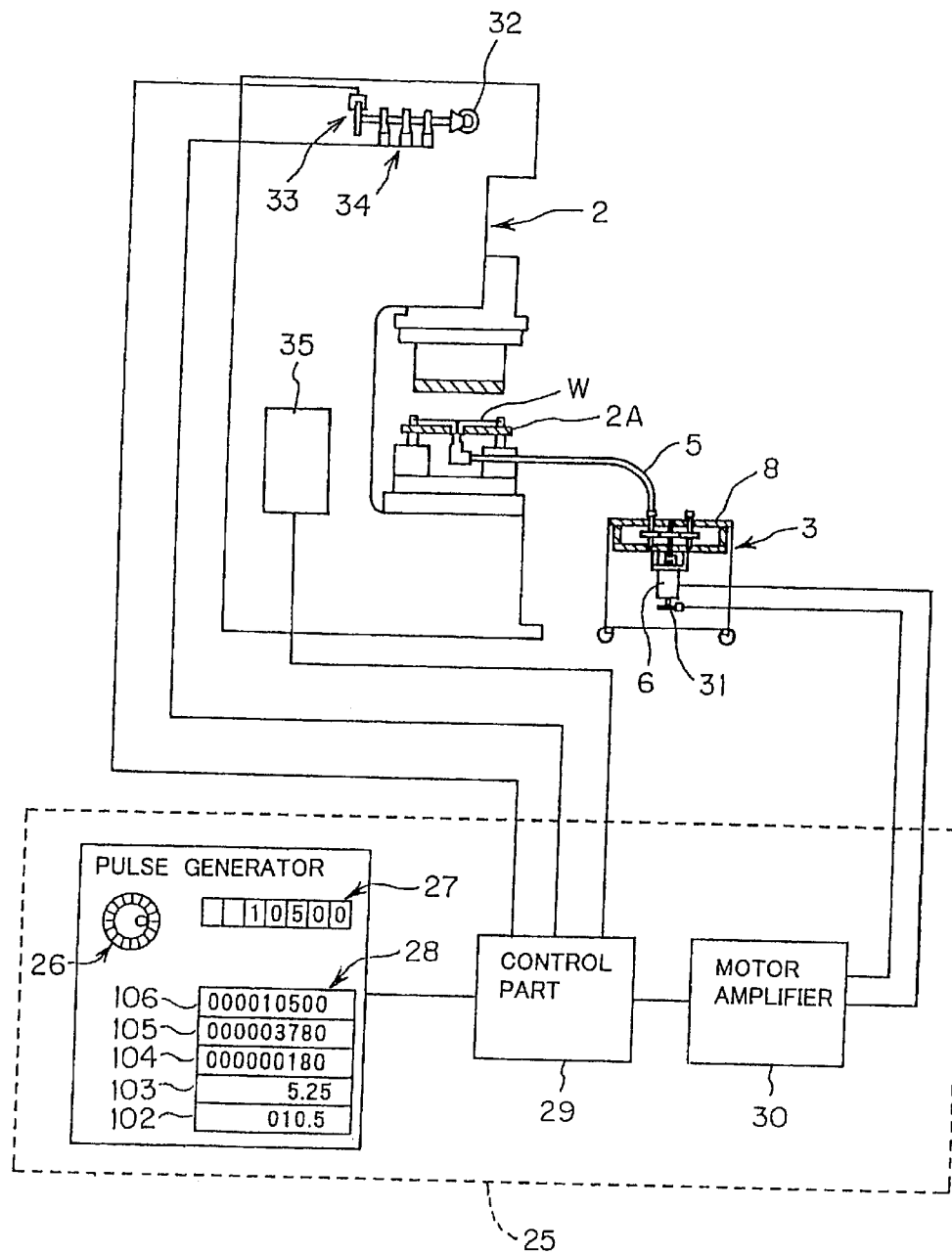
FIG. 10 is a diagram showing a control system of the drive unit.

Referring then to FIG. 10, a control system 25 is shown which is included in the drive units 3 and 3' and which comprises a manual pulse generator 26, an external counter 27, an indicator 28, 4 control part 29 and a motor amplifier 30.

The pulse motor 6 provided as a drive source in the drive unit 3 is driven on the basis of drive pulse signals issued from the motor amplifier 30, and its rotational angle is detected by a pulse encoder (rotary encoder) 31.

In cases where the gear ratio in the gearbox 8 is of the order of 1 as in this embodiment, the pulse motor 6 can typically be one having the maximum rotational speed of 2000 rpm or over.

The pulse count corresponding to the total rotational angle initially entered and stored in the external counter 27 is fed to the motor amplifier 30, which in turn issues an activation signal to put the pulse motor 6 in motion.

The pulse generator of the control system 25 preferably includes a pulse 102, a total angle 103, a halt angle 104, a feed length 105, and a pitch count 106, which may be displayed on the pulse generator.

In the event of this embodiment having a gear ratio equal to 1, the rotational angle of the pulse motor 6 corresponds precisely to the rotational angle of the spindle 19 shown in FIG. 3, and on the basis of a detection signal from the pulse encoder 31, the indicator 28 indicates a total angle obtained by converting the pulse count counted up from the reference position of the spindle 19 into the spindle rotational angle.

The indicator 28 further indicates the pitch count from the reference position corresponding to the advancing/retreating stroke of the spindle, as well as the feed length obtained by multiplying the pitch count by the actual pitch length.

In cases where one rotation of the pulse motor 6 is equal to 1,000 pulses and the gear ratio in the gearbox 8 is 1, the spindle can rotate through an angle of 0.36 degrees, i.e., 21' 31", which results in a minimal unit of control value of the rotational angle.

On the contrary, the pulse value corresponding to the spindle rotational angle acts also as a feed length control value. For example, when applied to P=0.5 mm which is the standard pitch of the M3 screw, 0.5 mm÷1,000=0.0005 mm, thus resulting in a sufficient control unit for the feed length.

The indicator 28 shown in FIG. 10 indicates the state where 10,500 pulses are entered into the external counter 27, with the spindle moved up to its advance end. The total rotational angle of the spindle is 3,780 degrees with a phase difference of 180 degrees relative to the halt angle at the retreat end.

At that time, the feed pitch count is 10.5 and the feed length is 5.25 mm.

In addition to the direct entry into the external counter 27, the pulse count corresponding to the total rotational angle may be stored in the counter by way of the manual pulse generation by means of the manual pulse generator 26 and through the spindle position visual check after the pulse motor inching action.

The manual pulse generator 26 can be used not only to perform teaching entry into the counter or the memory through the setting of the advance end and retrieve end of the spindle or the tap T, but also to manually impart pulses to the pulse motor 6 to perform tapping with visual checks.

In this embodiment, the function of the counter or the memory for storing the pulse count is provided by the external counter 27 but otherwise it may be incorporated in the control part 29 or in the motor amplifier 30.

The control part 29 feeds signals for the control of rotation of the pulse motor 6 to the motor amplifier 30. The control part 29 accepts signals from a pulse encoder (rotary encoder) 33 rotated by a main shaft 32 associated with the press 2, as well as signals from a press-associated rotary cam switch 34 comprising a rotary cam and a contact. The pulse encoder 33 and cam switch 34 are exemplary of sensors associated with the working machine, which may be responsive to the location of the movable parts of the working machine. The control part 29 interchanges interlock signals or the like with a press-associated control part 35.

The action of control of the pulse motor 6 will now be described. Together with the rotation of the main shaft 32, the press 2 allows a crank not shown to vertically move, and in conjunction with this motion of the crank, it performs loading/unloading of the workpiece W onto/from the lower platen 2A as well as a pressing work.

Once the main shaft 32 rotates and the control part 29 accepts a workpiece W feed completion signal from the press-associated rotary cam switch 34 serving to detect this rotational position, the control part 29 sends a rotation command signal to the motor amplifier 30.

Then, the motor amplifier 30 forwardly drives the pulse motor 6 previously halted at an angular position corresponding to the retreat end position of the spindle of the tapping unit 1, while simultaneously counting up the rotational angle of the motor shaft by means of the pulse encoder 31.

Then, at the point of time when the pulse count previously stored in the external counter 27 has become equal to the pulse count counted up by the pulse encoder 31, the pulse motor 6 is reversely driven.

The pulse motor 6 requires substantially no dwell time for the transition from the forward drive to the reverse drive, so that the spindle merely stops instantaneously at the advance end, and it immediately starts to retreat and comes to a half at a position returned by the same pulse count as the forward drive.

At that time, at the spindle retreat end the pulse motor 6 remains excited so as to keep its pulse position, whereby the shaft angle at the halt position is retained without using any electromagnetic brake or the like.

It is to be noted in this embodiment that when the spindle returns to the retreat end for halt, the control part 29 feeds a verification signal to the press-associated control part 35.

Figure 11:
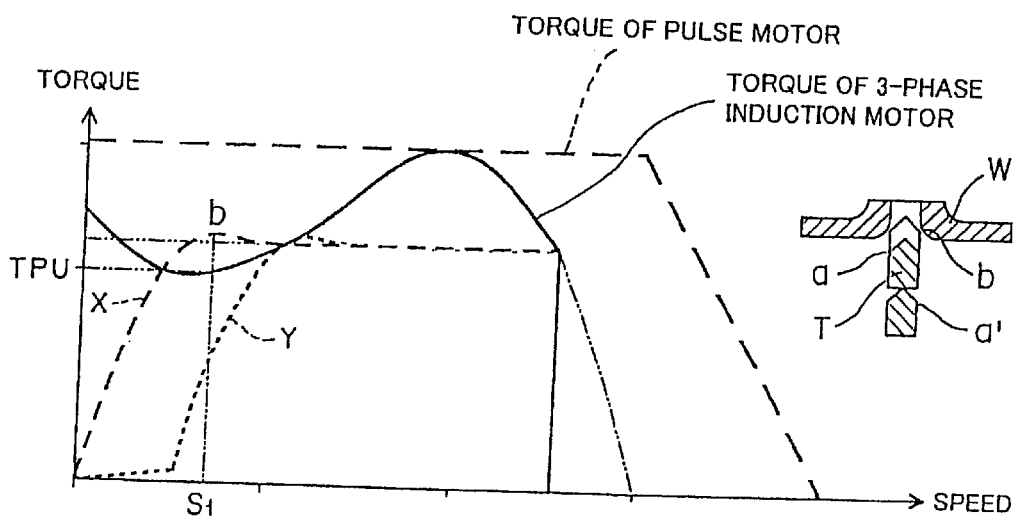
FIG. 11 shows in graphic representations the relationships between the generated torque and the rotational speed in a pulse motor and a three-phase induction motor.

Referring next to FIG. 11, there is shown in graphic representations the relationship among the rotational speeds and the torque generated by the pulse motor used as the drive source of the tapping unit of the present invention and the torque generated by the three-phase induction motor used as the drive source of the conventional tapper.

As is apparent from the graphic representations of FIG. 11, the pulse motor provides an extremely stabilized torque performance ensuring a fixed output torque independent of the rotational speeds within the practical range of rotational speeds.

In the three-phase induction motor on the other hand, a rotational speed $S_1$ resulting in the minimal advance torque (TPU) is present before reaching the load rotational speed at which the output torque balances with the load after the activation.

In view of eliminating any vain (useless) time in the tapping process, it is ideal to allow the tap T to advance from the retreat end at the position a where the tip of the tap T substantially coincides with the bottom surface of the workpiece W, and to bite into the prepared hole formed in the workpiece W at the position b.

However, the load torque applied to the motor is represented by a curve X when the tip of the tap T is driven and advances from the position a and bites into the prepared hole of the workpiece W at the position b to initiate the tapping work. Thus, in the case of the three-phase induction motor the rotational speed results in $S_1$ in the vicinity of the position b allowing the output torque to fall down to the TPU, whereupon the motor may possibly come to a stop since the output torque goes lower than the load torque upon the tapping work.

In order to solve this, the tap T starts from the position a' retreated further from the retreat end of the tap T. The load torque in this case is represented by a curve Y, in which the output torque comes to exceed the load torque before reaching the position b.

However, this means that the machining time becomes lost in order to retreat the retreat end of the tap T to the position a'. Furthermore, due to its greater bite in the case of rolled tap in particular, the halt of the motor during the tapping work may possibly result in a higher load torque, which may often exceed the TPU, making it difficult for the tap T to be disengaged from the workpiece W.

In this respect, the pulse motor is free from such a problem within the practical range of rotational speeds since its output torque exceeds the load torque at all times. Furthermore, due to its ability to allow the tap T to be separated from the workpiece W by a required minimal distance and thereafter to drive the tap T from the retreat limit position for the tapping work, it is possible to eliminate any loss in working time as well as to perform tapping based on the minute speed rotation, which would be difficult to perform by the three-phase induction motor.

Figure 12:
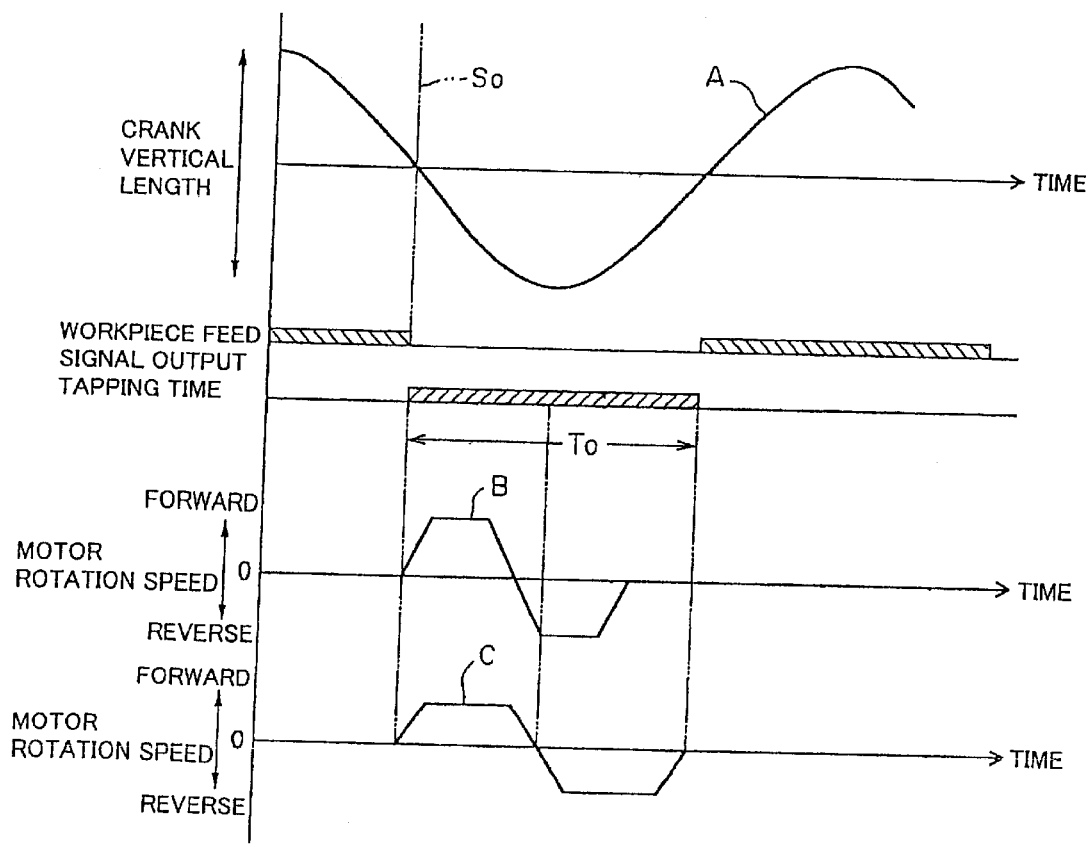
FIG. 12 is a timing chart showing the timings of actions of the press and the pulse motor.
Figure 13:
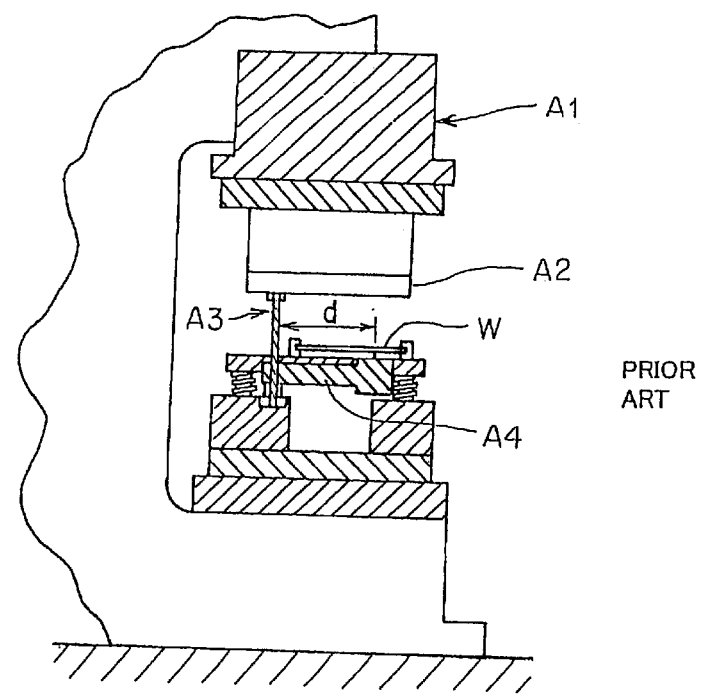
FIG. 13 is a diagram showing an example of the conventional tapper.
Figure 14:
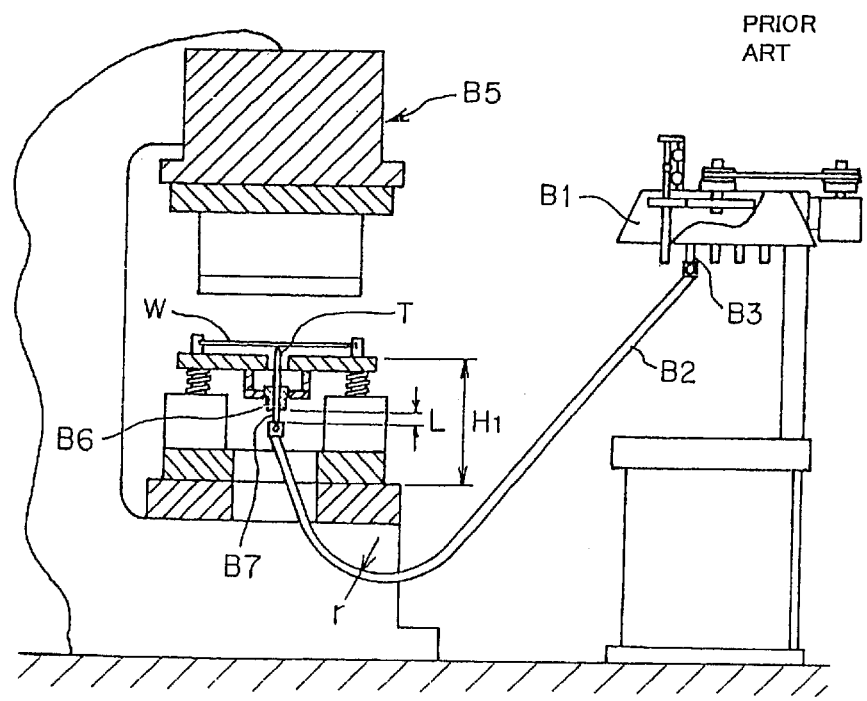
FIG. 14 illustrates another example of the conventional tapper.

FIG. 12 is a timing flowchart showing the action timings of the press 2 and the pulse motor 6, in which the graph A represents the timing of the vertical actions of the crank of the press 2.

The graph B represents the timing and speed of the rotation of the pulse motor 6 when the pulse motor 6 performs one cycle action of the forward, reverse and halt from the point of time when the control part 29 has accepted a workpiece W feed completion signal $S_0$ of the press 2 from the press-associated rotary cam switch 34.

In this case, the time taken for one cycle action by the pulse motor 6 is set to be shorter than the halt time $T_0$ of the workpiece W.

Due to the necessity to complete the tapping action before the initiation of the workpiece W feed action of the press 2, the tapping action is subjected to synchronous verification, and if the one cycle action is not complete before the start of feed of the workpiece W, a synchronous error is judged, providing an interlock signal as output to the press-associated control part 35.

Note that in the case of providing the control shown in the graph B, the pulse encoder 33 on the press 2 side is not in use.

The graph C shows the timing and speed of the rotation of the pulse motor 6 in cases where the rotational angles of the main shaft 32 of the press 2 are continuously detected by the pulse encoder 33 in place of the rotary cam operated rotary cam switch 34 and where the relationship between the resultant pulse signals and the rotational angles of the pulse motor 6 are programmed in advance to thereby subject the rotational angles of the pulse motor 6 to the absolute value control.

As set forth hereinabove, according to the present invention, the tapping unit with a reduce size and weight coupled via the rotation transmission cable to the drive unit is arranged to be mounted on the working machines such as presses, robots, transfer apparatuses, etc., so that the tapping work can be performed during the processes of those working machines while allowing a selection, with a higher degree of freedom, of the positions of the drive unit to be mounted to the working machines.

In addition, since the spindle fitted with the tap is directed at substantially right angles relative to the input shaft to which the rotation transmission cable is coupled, the tapping unit can be attached at various orientations onto the machine body, dies, hands, etc., of the presses, robots, transfer apparatuses, etc., thereby achieving a tapping work during the processes of the working machines, with a higher degree of freedom similar to the case of the multiple tapper.

Furthermore, by virtue of the structure in which only the load torque upon the tapping work acts on the input shaft connecting to the rotation transmission cable, with the advance/retrieve movement effected by the spindle being not transmitted to the rotation transmission cable, the rotation transmission cable is not subjected to any surplus load, thereby ensuring an effective transmission of the driving force to the spindle from the drive source located apart from the tapping unit.

Furthermore, the interior of the housing is hermetically sealed so that the externally threaded portion of the spindle is not exposed to the exterior of housing, thereby eliminating any fears that dust or the like may enter the interior of the hosing or the lubricant within the housing may leak out to dirty the peripheries.

According to the invention, the oil storage groove is provided to store the lubricant for lubricating the gap between the externally threaded portion of the spindle and the internally threaded portion of the master metal so that the lubricant is supplied to the gap between both the threaded portions by the rotation of the spindle, thereby maintaining a good lubricating state at all times to reduce any power loss, as well as obviating any troubles such as seizing arising from the short of oil films.

According to the invention, use of the pulse motor as the drive source included in the drive unit eliminates the necessity for a large capacity of switching for halt control or the need to actuate the electromagnetic brake, thereby making it possible to be free from heating or abrasion of the brakes or contacts as well as to simplify the drive unit for driving the tapping unit.

The tap can be rotated at a high speed in the forward and reverse directions by a stabilized torque with reduced process time, and the pulse motor can be rotated at a minute speed by manual operations by use of the manual pulse generator, whereby it is possible to perform the teaching setting of optimal positions of the tap advance end and the retreat end as well as to perform minute speed machining.

Also, by virtue of the acquisition of a high halt accuracy, even in the case of tapping the blind prepared hole, a high accuracy tapping work can be achieved in spite of possible strikes on the hole bottom by the tap every time, without any fear of damaging the hole bottom or the tap and without requiring any skills.

According to the invention, as compared with the case of operating the tap in mechanical conjunction with the actions of the press or the like, synchronism can easily be achieved enabling the timing of the tapping to securely follow the high-speed actions of the working machine such as the press.

While an illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. A tapping apparatus, for tapping a workpiece with a tap, adapted to use with a movable member of a working machine, said movable member adapted to be displaced together with the workpiece; the tapping apparatus comprising:
   (a) a drive unit including a drive output shaft;
   (b) a rotation transmission cable coupled to the drive output shaft; and
   (c) a tapping unit comprising:
      a housing, including an hermetically sealed interior, removably secured to the movable member of the working machine;
      an input shaft rotatably supported via a first bearing within the interior of said housing, said input shaft including an input shaft first end protruding outwardly from said housing, said input shaft first end being coupled to the drive output shaft of the drive unit by way of the rotation transmission cable;
      an input shaft second end being fixedly secured, within said housing, to a driving bevel gear;
      a driven bevel gear meshed with said driving bevel gear and rotatably supported via a second bearing at a fixed location within said housing;
      a spindle rotating jointly and coaxially with said driven bevel gear, said spindle being coupled to said driven bevel gear in such a manner as to allow a relative displacement in an axial direction;
      said spindle including a spindle first end protruding outwardly from said housing and including a spindle chuck adapted for holding the tap;
      said spindle including an interior portion being disposed at all times within the interior of said housing, said interior portion including an externally threaded spindle portion formed on an outer periphery thereof; and
      a master metal fixedly secured to the interior of said housing, said master metal including an internally threaded portion mating with said externally threaded spindle portion of said spindle.

2. The tapping apparatus according to claim 1, wherein said internally threaded portion of said master metal comprises at least one oil storage groove extending in a direction intersecting with thread grooves.

3. The tapping apparatus according to claim 1, wherein said drive unit comprises a drive source including a pulse motor, whereby forward and reverse actions of the tap in a tapping process are effected in a brief period of time during which the movable member of the working machine carries the workpiece, and wherein timing of the forward and reverse actions and of halting are controlled on the basis of timing signals issued from a sensor associated with the working machine, the sensor being responsive to a location of the movable member.

4. The tapping apparatus according to claim 3, wherein said internally threaded portion of said master metal comprises at least one oil storage groove extending in a direction intersecting with thread grooves.

5. The tapping apparatus according to claim 1, comprising an absolute-value control wherein:
   said drive unit comprises a pulse motor; and a rotational angle and axial location of the tap is a function of timing signals issued from a sensor associated with the working machine, the timing signals being fed to the pulse motor.

6. The tapping apparatus according to claim 5, comprising a control system; and wherein the absolute-value control comprises a relationship between the timing signals and pulse motor rotational angles, the relationship being programmed in advance;

whereby pulse motor rotational angles correspond to pulse signals accepted in real time.

7. The tapping apparatus according to claim 6, wherein the sensor comprises a rotary encoder.

8. The tapping apparatus according to claim 6, wherein the sensor comprises a press-associated rotary cam switch comprising a rotary cam and a contact.

9. The tapping apparatus according to claim 5, wherein said internally threaded portion of said master metal comprises at least one oil storage groove extending in a direction intersecting with thread grooves.

10. The tapping apparatus according to claim 1, wherein the working machine includes a press.

* * * * *